(12) United States Patent
Soong et al.

(10) Patent No.: US 11,855,454 B2
(45) Date of Patent: Dec. 26, 2023

(54) POWER SUPPORTING ARRANGEMENT FOR A POWER GRID OPERATED AS A VIRTUAL SYNCHRONOUS MACHINE

(71) Applicant: Hitachi Energy Switzerland AG, Baden (CH)

(72) Inventors: Theodore Soong, Västerås (SE); Jean-Philippe Hasler, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/920,693

(22) PCT Filed: Apr. 23, 2020

(86) PCT No.: PCT/EP2020/061265
§ 371 (c)(1),
(2) Date: Oct. 21, 2022

(87) PCT Pub. No.: WO2021/213655
PCT Pub. Date: Oct. 28, 2021

(65) Prior Publication Data
US 2023/0178996 A1    Jun. 8, 2023

(51) Int. Cl.
*H02J 3/42* (2006.01)
*H02J 3/48* (2006.01)

(52) U.S. Cl.
CPC ..................... *H02J 3/42* (2013.01); *H02J 3/48* (2013.01); *H02J 2203/20* (2020.01); *H02J 2300/20* (2020.01)

(58) Field of Classification Search
CPC .. H02J 3/42; H02J 3/48; H02J 2203/20; H02J 2300/20
See application file for complete search history.

(56) References Cited

U.S. PATENT DOCUMENTS

| | | |
|---|---|---|
| 2003/0011348 A1 | 1/2003 | Lof et al. |
| 2003/0124919 A1* | 7/2003 | Geil ......................... B63H 5/08 440/1 |

(Continued)

FOREIGN PATENT DOCUMENTS

| | | |
|---|---|---|
| CN | 107370181 A | 11/2017 |
| CN | 108429272 A | 8/2018 |

(Continued)

*Primary Examiner* — Ziaul Karim
(74) *Attorney, Agent, or Firm* — Slater Matsil, LLP (57) ABSTRACT

A method can be used to control a voltage source converter of a power supporting arrangement to act as a virtual synchronous machine. The method includes obtaining a measured power level of the converter, processing the measured power level using a differential equation of an angular velocity of the virtual synchronous machine in order to obtain a control contribution, providing a phase angle of a physical quantity used to control the converter based on the control contribution, monitoring the ability of the converter to act as a virtual synchronous machine, determining that the ability of the converter to act as a virtual synchronous machine is deemed insufficient, and adjusting the control contribution by increasing the damping term and/or decreasing the moment of inertia term in response to determining that the ability of the converter to act as a virtual synchronous machine is deemed insufficient.

12 Claims, 3 Drawing Sheets

(56) References Cited

U.S. PATENT DOCUMENTS

| | | | | |
|---|---|---|---|---|
| 2004/0236450 A1* | 11/2004 | Bryant | ............... | G05B 23/0297 |
| | | | | 700/108 |
| 2005/0073279 A1* | 4/2005 | Fenley | ................... | H02P 6/15 |
| | | | | 318/717 |
| 2019/0109461 A1* | 4/2019 | Khajehoddin | ............ | H02J 3/40 |

FOREIGN PATENT DOCUMENTS

| | | | |
|---|---|---|---|
| CN | 110601272 A | 12/2019 | |
| CN | 110994680 A | 4/2020 | |
| EP | 2683077 A1 | 1/2014 | |
| EP | 3534522 A1 | 9/2019 | |
| JP | 2014509179 A | 4/2014 | |
| JP | 2019080476 A | 5/2019 | |
| JP | 2019176584 A | 10/2019 | |
| WO | 03007455 A1 | 1/2003 | |

\* cited by examiner

POWER SUPPORTING ARRANGEMENT FOR A POWER GRID OPERATED AS A VIRTUAL SYNCHRONOUS MACHINE

CROSS-REFERENCE TO RELATED APPLICATIONS

This application is a national stage application of International Application No. PCT/EP2020/061265, filed on Apr. 23, 2020, which application is hereby incorporated herein by reference.

TECHNICAL FIELD

The present invention relates to a power supporting arrangement for a power grid.

BACKGROUND

Power grids of today are often weak due to the increase of renewable energy sources such as wind and solar farms. Thereby the frequency stability of such grids is also lowered.

Power supporting arrangements provided for power grids are often based on voltage source converters. In order to support such weak grids, a voltage source converter of a power supporting arrangement is often operated as a virtual synchronous machine (VSM).

One operating mode is then to act as a voltage source that synchronises to the grid using a control that is based on a frequency swing equation. The voltage source converter thus appears like a voltage source that synchronises with the power grid using the swing equation.

However, in case the converter is unable to act as a VSM, for instance because its capabilities are exhausted or close to being exhausted, then the converter normally needs to change from VSM operation to current source operation. In this case also the synchronisation method may need to change. For instance, a phase-locked loop (PLL) may need to be used instead of the swing equation. This type of mode switching between synchronisation methods is difficult to achieve in a continuous and consistent way. Use of a PLL may also lead to instability, especially in weak power grids.

There is therefore a need for allowing the operation to be continued even though the capability of the voltage source converter for this operation is exhausted or close to being exhausted.

SUMMARY

The present invention relates to a power supporting arrangement for a power grid. Particular embodiments are concerned with a method and computer program product for controlling a voltage source converter of a power supporting arrangement to act as a virtual synchronous machine, a control device for a voltage source converter and a power supporting arrangement. For example, embodiments are directed towards providing continued operation of a voltage source converter as a virtual synchronous machine when its capability for this type of operation is exhausted or close to being exhausted.

A first aspect is achieved through a method of controlling a voltage source converter of a power supporting arrangement to act as a virtual synchronous machine. The method comprises obtaining a measured power level of the converter, processing the measured power level using a differential equation of the angular velocity of the virtual synchronous machine in order to obtain a control contribution, providing the phase angle of a physical quantity used to control the converter based on the control contribution, monitoring the ability of the converter to act as a virtual synchronous machine, and adjusting the control contribution based on the monitoring.

A second aspect is achieved through a control device for a voltage source converter of a power supporting arrangement. The voltage source converter operates as a virtual synchronous machine. The control device is configured to obtain a measured power level of the converter, process the obtained power level using a differential equation of the angular velocity of the virtual synchronous machine in order to obtain a control contribution, provide the phase angle of a physical quantity used to control the converter based on the control contribution, monitor the ability of the converter to act as a virtual synchronous machine, and adjust the control contribution based on the monitored ability.

A third aspect is achieved through a power supporting arrangement comprising a voltage source converter and a control device for controlling the voltage source converter to operate as a virtual synchronous machine, which control device is a control device according to the second aspect.

A fourth aspect is achieved through a computer program product for controlling a voltage source converter of a power supporting arrangement to act as a virtual synchronous machine. The computer program product comprises a data carrier with computer program code that when acted upon by a processor of a control device is configured to obtain a measured power level of the converter, process the obtained power level using a differential equation of the angular velocity of the virtual synchronous machine in order to obtain a control contribution, provide the phase angle of a physical quantity used to control the converter based on the control contribution, monitor the ability of the converter to act as a virtual synchronous machine, and adjust the control contribution based on the monitored ability.

The monitoring may be a monitoring of the state of the converter, such as physical quantity, which physical quantity may be a temperature of the converter or a physical quantity that it is capable of delivering or receiving, such as current or power. The monitoring may be the monitoring of a physical quantity limitation of the voltage source converter, such as a current, power or temperature limitation. The adjusting may in turn be based on a determination that the ability to act as a virtual synchronous machine is deemed insufficient, where a determination that the ability is insufficient may be based on the monitored state of the converter.

The voltage source converter may comprise cells, which cells may be full-bridge cells, half-bridge cells or a mixture of full-bridge and half-bridge cells. The converter may be delta-connected, where the cells are connected in phase legs that are connected in a delta configuration between phases of an AC power grid. Alternatively, the converter may be wye-connected, where cells are connected in phase legs that are connected in a wye-configuration between phases of an AC power grid. A wye-connected converter may additionally have an AC side for connection to the AC power grid and a DC side.

The power supporting arrangement may further comprise an energy storage system connected to the voltage source converter. The energy storage system may comprise one or more energy storage units, such as one or more batteries and/or supercapacitors. The energy storage units may be distributed among the cells. If the converter is a wye-connected converter the energy storage system may be connected to the DC side of the voltage source converter.

The power supporting arrangement may additionally comprise a DC link with a first DC line connected between the DC side of the voltage source converter and a first end of the energy storage system and a second DC line connected between the DC side of the voltage source converter and a second end of the energy storage system. The voltage source converter may in this case comprise a first group of phase legs connected between the first DC line and corresponding phases of the power grid and a second group of phase legs connected between the second DC line and corresponding phases of the power grid. Both the first and second groups of phase legs may additionally be wye-connected.

The adjusting may comprise increasing the control contribution for a decrease in the ability of the converter to act as a virtual synchronous machine.

In one variation the adjusting may comprise adding an offset to the control contribution obtained from a phase locked loop. The offset may be a delay obtained through the phase-locked loop.

The differential equation of the angular velocity of the virtual synchronous machine may be a swing equation defining the change in the angular velocity of the virtual synchronous machine over time. The change in the angular velocity of the virtual synchronous machine over time may additionally be defined as the sum of a first and a second expression, where the first expression comprises the inverse of a moment of inertia term times a difference between a measured power and a power reference and the second expression comprises a damping term times a difference between the angular velocity of the virtual synchronous machine and a reference angular velocity.

The differential equation may thus comprise at least one coefficient and the adjustment may be the adjustment of the coefficient. One example of a coefficient that is present in the swing equation is a moment of inertia term. Another example of a coefficient that is present in the swing equation is a damping term. The adjustment may then comprise the adjustment of the moment of inertia term and/or the damping term.

The adjustment may comprise an increase in the damping term if the ability of the converter to act as a virtual synchronous machine is deemed insufficient. The adjustment may also comprise a decrease in the moment of inertia term if the ability of the converter to act as a virtual synchronous machine is deemed insufficient.

The coefficient of the differential equation, such as the moment of inertia term and/or the damping term of the swing equation, may have two different values, a first steady state value during steady state operation and a second value to be used if the ability of the converter to act as a virtual synchronous machine is insufficient.

The monitoring may comprise comparing a physical quantity of the converter with a corresponding physical quantity threshold, determining that the converter is unable to act as a virtual synchronous machine in case the threshold is reached and performing the adjusting of the control contribution based on the determining that the converter is unable to act as a virtual synchronous machine. The physical quantity may be a quantity of current or power that is delivered to or received by of the converter and the threshold may be a current or power limit threshold. The physical quantity may also be a temperature of the converter, such as temperature of a phase leg and the threshold may in this case be a temperature threshold, such as a maximum temperature threshold of a phase leg.

The coefficient of the differential equation, such as the inertia term of the swing equation, may be provided as an at least piecewise continuous function of the available capability of the converter, such as the available current, power and/or thermal capability.

In this case the monitoring may comprise monitoring the available current, power and/or thermal capability of the converter and the adjusting may comprise using the momentaneous available current power and thermal capability in the function so that the inertia is changed for different values of the available current, power and thermal capability. In this case the inertia term may additionally increase for an increase in the available current, power and thermal capability and decrease for a decrease in the available current, power and thermal capability.

The present invention has a number of advantages. It allows the control using the swing equation to be continued even if the capability of the voltage source converter to act as a virtual synchronous machine is exhausted or close to being exhausted. This type of operation also avoids jitter in the current delivered by the converter.

BRIEF DESCRIPTION OF THE DRAWINGS

The present invention will in the following be described with reference being made to the accompanying drawings, where FIG. 1 schematically shows a power supporting arrangement comprising a voltage source converter, an energy storage system and a control device, FIG. 2 schematically shows converter control implemented in the control device for controlling the converter using a swing equation.

DETAILED DESCRIPTION OF ILLUSTRATIVE EMBODIMENTS

In the following, a detailed description of preferred embodiments of the invention will be given.

Figure 1:
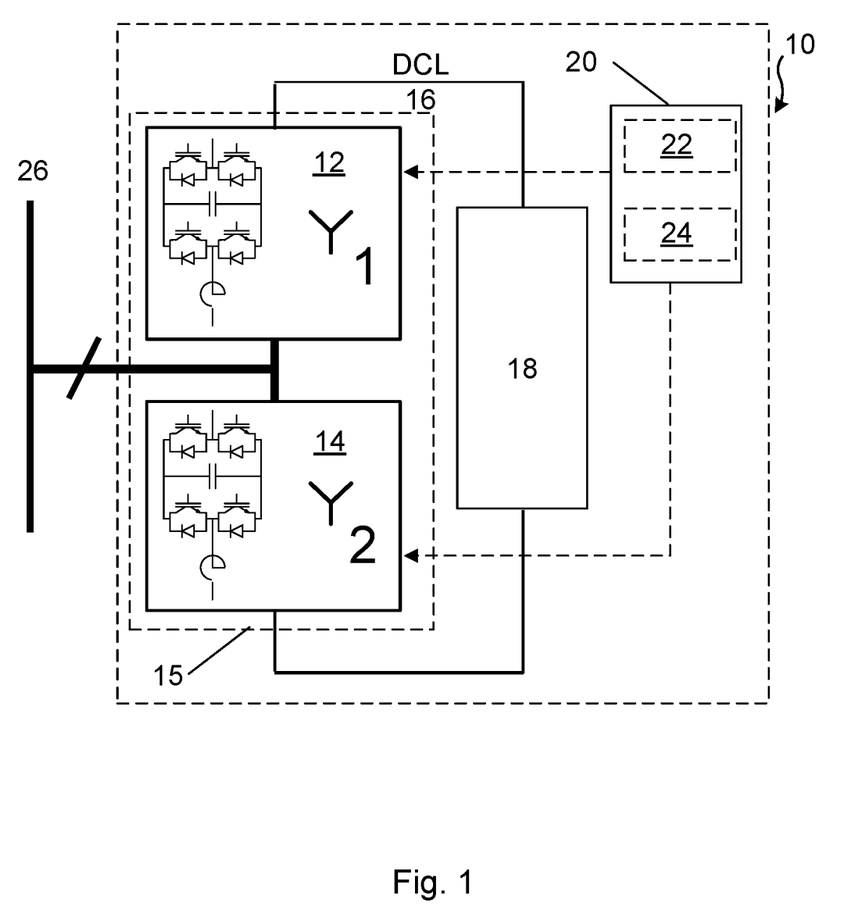

FIG. 1 shows a power supporting system 10 for a power grid 26, which may be an AC power grid. The power supporting system 10 comprises a voltage source converter (VSC) 15 having an AC side for connection to the power grid 26 and a DC side. The VSC 15 further comprises a first group of phase legs 12 and a second group of phase legs 14, where both groups comprise cells, in the figure shown as full-bridge cells. The first group of phase legs 12 comprises three wye-connected phase legs, where each phase leg is at one end connected to a first DC line of a DC link DCL 16 and the other end is connected to a corresponding phase of the power grid 26. In a similar manner the second group of phase legs 14 also comprises three wye-connected phase legs, where each phase leg is at one end connected to a second DC line of the DC link DCL 16 and at the other end is connected to a corresponding phase of the power grid 26.

The first group of phase legs 12 is thus connected between the first DC line and corresponding phases of the power grid 26 and the second group of phase legs 14 is connected between the second DC line of the DC link and corresponding phases of the power grid 26. Thereby the second ends of the phase legs in the first group 12 are also connected to the second ends of the phase legs of the second group 14. As both groups are wye-connected, the voltage source converter 15 formed by the two groups may be considered to be a double-Y converter. The converter 15 is furthermore typically connected to the power grid 26 via a transformer (not shown). The cells of the phase legs were above shown as full-bridge cells. As an alternative a phase leg may comprise half-bridge cells or a mixture of full-bridge and half-bridge cells.

The power supporting arrangement 10 also comprises an energy storage system ES 18 connected to the VSC 15. The energy storage system 18 may comprise one or more energy storage units, such as one or more batteries supercapacitors and/or flywheels in order to provide electrochemical, dielectric or kinetic energy storage. The energy storage system 18 is connected to the DC link 16. The first DC line of the DC link is in this case connected between the DC side of the voltage source converter and a first end of the energy storage system and the second DC line is connected between the voltage source converter and a second end of the energy storage system. The energy storage system 18 is thereby also connected to the DC side of the VSC 15.

It should here be realized that the shown converter is only one example of converter that may be used. It is for instance possible with a converter only comprising one group of wye-connected phase legs. Furthermore, when there is only one group of phase legs, the phase legs of the group may additionally be delta-connected. The phase legs may in this case thus be connected in a delta configuration between phases of the AC power grid.

The energy storage units of the energy storage system can for the various converter relations be distributed among the cells. As can be seen in FIG. 1, a cell may comprise a capacitor. In this case an energy storage unit of the energy storage system may be connected in parallel with a corresponding cell capacitor.

There is finally a control device 20 that is used to control the voltage source converter 15. The VSC is in this example realized as processor 22 that acts on computer program instructions stored in a program memory 24, where the computer program instructions implement the control functionality of the control device 20. The control is indicated through dashed arrows going from the control device 20 to each group of phase legs 12 and 14 in the VSC 15.

Figure 2:
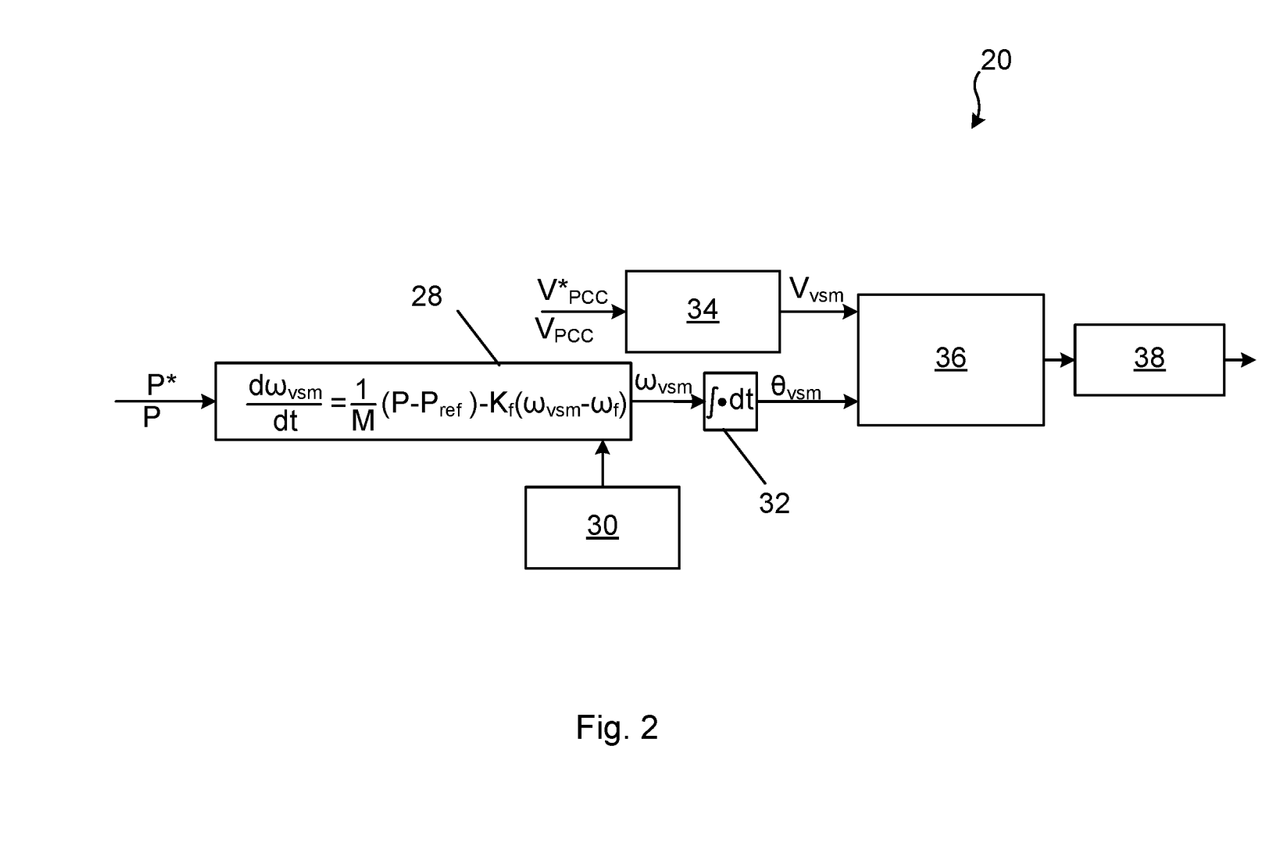
Figure 3:
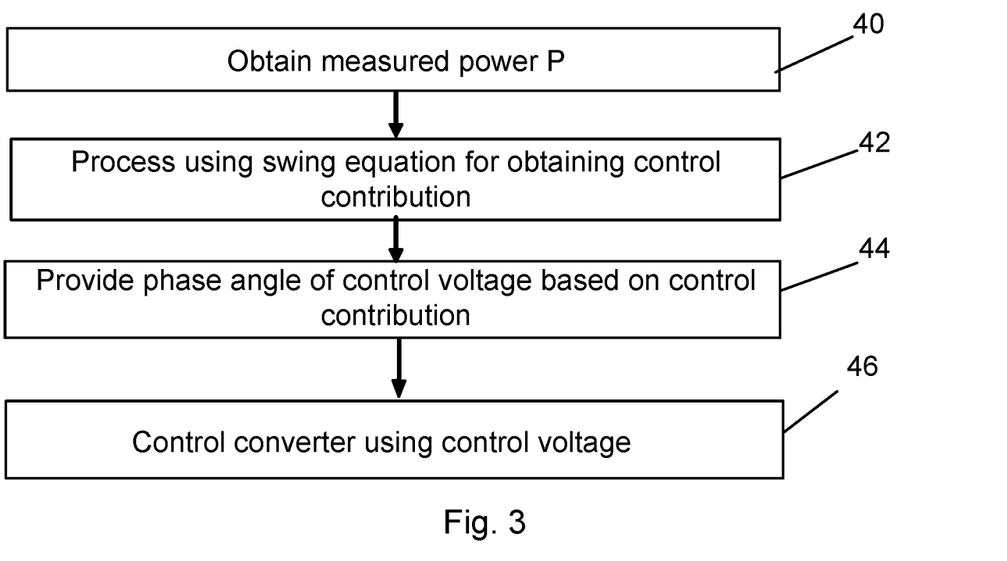
FIG. 3 shows a flow chart of a number of method steps for producing and using a control contribution in the control of the voltage source converter.

The control performed by the control device 20 is to control the VSC 15 as a virtual synchronous machine using voltage control. How such control may generally be implemented is schematically shown in FIGS. 2 and 3. The control device 20 comprises a voltage controller block 34 that receives a measured voltage $V_{PCC}$, which may be the measured voltage of the power grid 26, which is typically a point of common coupling PCC. The voltage controller block 34 also receives a desired voltage of the power grid $V^*_{PCC}$. The voltage controller block 34 then generates a virtual synchronous machine voltage Vvsm based on these two voltages, which may be done through applying proportional and possibly also integrating control on the difference between the desired and actual grid voltage. The virtual synchronous machine voltage Vvsm is then submitted to a reference generator and current controller block 36.

The control device 20 also comprises an inertia processing block 28 that obtains a measured power level P and a desired power level P* and processes the measured power level P using a differential equation of the angular velocity of the virtual synchronous machine for obtaining a control contribution. The differential equation may be a differential swing equation defining the change in the angular velocity of the virtual synchronous machine over time. The inertia processing block 28 outputs a control contribution in the form of an angular velocity ωvsm, which control contribution is then integrated in an integrator block 32 in order to obtain a virtual synchronous machine phase angle θvsm.

The virtual synchronous machine phase angle θvsm is also supplied to the reference generator and proportional current controller block 36, which block 36 processes the virtual synchronous machine voltage ωvsm and phase angle θvsm in order to obtain a control signal that is sent to a modulator block 38. The modulator block 38 performs modulation, such as Pulse Width Modulation (PWM), and as a result provides one or more control pulses that are being sent to the VSC 15. In the control device 20 there is also a control contribution adjuster block 30 connected to the control path between the input of the inertia processing block 28 and the input of the controller block 36. In FIG. 2 the control contribution adjuster block 30 is shown as being connected to the inertia processing block 28. It should be realized that it may as an alternative be connected between the inertia processing block 28 and the integrator block 32 or between the integrator block 32 and the controller block 36, where such a connection to the path between the inertia processing block 28 and the controller block 36 may be made via an adding block.

The use of the inertia processing block 28, the integrator block 32, the voltage controller block 34, the reference generator and proportional current controller block 36 is as such known and will therefore not be discussed in any further detail. However, the control is the control of the VSC 15 to act as a virtual synchronous machine using voltage control, where the inertia processing block 28 employs a swing equation for obtaining the phase angle used to introduce inertia in the power grid 26.

As can be seen in FIG. 2 and as is indicated in the flow chart in FIG. 3, the control device 20 obtains a measured power P, step 40, which may be the power that the converter receives from or delivers to the power grid 26. The measured power P is supplied to the inertia processing block 28. The inertia processing block 28 processes the measured power P using a differential equation of the angular velocity of the virtual synchronous machine, for obtaining a control contribution ωsvf, which differential equation in the present example is the above-mentioned swing equation, step 42. It can be seen that the inertia processing block 28 applies the swing equation on the measured power P, where the swing equation is a deferential equation, where a differential angular velocity is determined according to:

$$\frac{d\omega_{vsm}}{dt} = \frac{1}{M}(P - P_{ref}) - K_f(\omega_{vsm} - \omega_f) \quad (1)$$

As can be seen, according to the swing equation, the time derivative of the angular velocity of the virtual synchronous machine dωsvm/dt, i.e., the change in the angular velocity of the virtual synchronous machine over time, is set equal to the sum of a first and a second expression, where the first expression comprises an inertia term M, the inverse of which is multiplied with a difference between the measured power P and a power reference Pref and the second expression comprises a damping term Kf that is multiplied with a difference between the angular velocity ωvsm of the virtual synchronous machine ωvsm and a reference angular velocity ωf.

The processing leads to the obtaining of a control contribution in the form the angular velocity ωvsm of the virtual synchronous machine, which after integration in the integrator 32 provides a virtual synchronous machine phase angle θvsf. The provided phase angle is thus based on the control contribution. The phase angle is thus based on the control contribution and supplied to the controller block 36, in which it is used to provide the phase of the control voltage Vvsm, step 44, where the control voltage thus is the virtual synchronous generator voltage Vvsm obtained from the voltage controller 34. The control device 20 then controls the converter, via the processing performed in the controller block 36 and modulator block 38, where the control comprises control of the converter using the phase and voltage of the virtual synchronous machine, step 46.

Due to an increased adoption of renewables and decommissioning of traditional generation, grid operators are being confronted by power grid systems with low inertia and low short-circuit levels. Focusing on low inertia, which manifests as high rate-of-change-of-frequency (ROCOF), fast frequency and synthetic inertia response services are being proposed in some grid codes to mitigate the issue.

Such synthetic inertia is typically provided with the use of the power supporting arrangement 10. The power supporting arrangement shown in FIG. 1 may be considered to be an enhanced Static VAR Compensator (STATCOM), since it combines a STATCOM with an energy storage, whether it be electrochemical, dielectric, or kinetic, to provide frequency response and synthetic inertia responses. Synthetic inertia bases its operation on the differential equation of the angular velocity of the virtual synchronous machine, where the voltage source converter has traditionally acted as a virtual synchronous machine with a fixed inertia constant. A typical STATCOM, i.e., a power supporting arrangement without an energy storage system, operates more like a current source that synchronizes with the power grid using a phase-locked loop (PLL), while an enhanced STATCOM operating as a virtual synchronous machine (VSM) appears more like a voltage source that synchronizes with the power grid using the differential equation. An enhanced STATCOM using VSM would deliver current as necessary, depending on the power grid.

However, an enhanced STATCOM has both power and current limits, which normally requires it to change from VSM operation to current source operation. The synchronization method may also need to change, such that a PLL should be used instead of the differential equation of the angular velocity of the virtual synchronous machine. This thus results in a mode switching between synchronization methods. Such mode switching is difficult to achieve in a continuous and consistent way. The mode switching may cause jitter of the output current as the STATCOM may be transiently switching between modes when operating near its boundaries. Use of a PLL may also lead to instability, especially in weak power grids.

Aspects of the invention are directed toward addressing one or more of the above-mentioned problems.

Aspects of the invention address this through operating the power supporting arrangement 10 and in this case the VSC 15 operates as a VSM, but where the control contribution that is produced by the inertia processing block 28 varies based on the state of the converter, such as based on the delivered power, current or temperature reaching a corresponding threshold or based on the remaining power, current or thermal capability.

The idea is thus to base the VSM operation on the differential equation, here exemplified by the swing equation, only without the assistance of a PLL during power or current limit situations. Thereby there is no need to switch over to PLL control.

Figure 4:
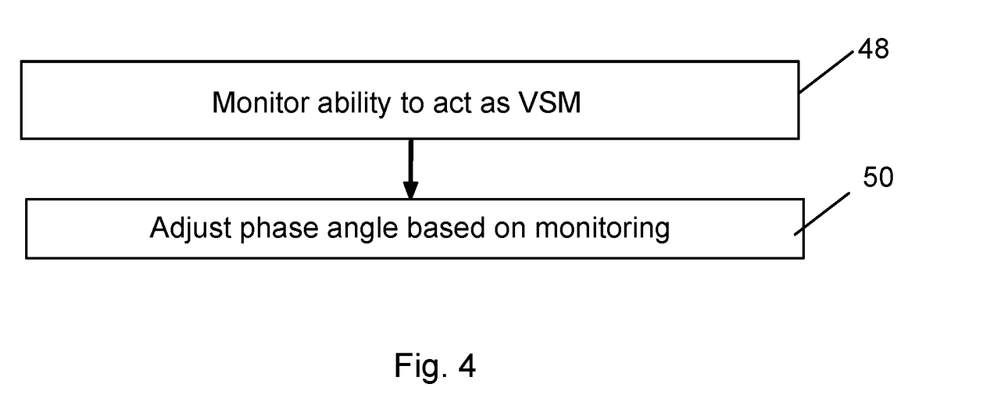
FIG. 4 shows a flow chart of two additional method steps for the adjusting of the control contribution, and FIG. 5 schematically shows a computer program product in the form of a data carrier with computer program instructions for implementing the control device.

The general operation will now be described with reference being made also to the flow chart in FIG. 4, the steps of which are carried out by the control contribution adjuster block 30. The control contribution adjuster block 30 of the control device 20 monitors the ability of the VSC 15 to handle power support as a virtual synchronous machine, step 48. It thus monitors its ability to act as a virtual synchronous machine. The monitoring may be a monitoring of the state of the converter, such as its ability to deliver or receive a physical quantity such as current, power or an operational temperature of the converter, such as a temperature of a phase leg. This may be a monitoring of a physical quantity delivered to or received from the power grid, where the physical quantity may comprise the current and/or power. Alternatively, it may be a physical quantity such as temperature. The monitoring may thereby be the monitoring of a physical quantity limitation of the voltage source converter, such as a current, power or thermal limitation. A thermal limitation may in this case be a maximum allowed phase leg temperature. The monitoring may also be a monitoring of the remaining capability of delivering or receiving a physical quantity such as current or power, which may involve monitoring the capacity of the energy storage system to receive or deliver energy. The remaining capability may also be a remaining thermal capability. The monitoring may in this case also involve determining a momentaneous delivered or received physical quantity, like current or power, and determining the remaining capability based on both the remaining energy storage system capacity and delivered or received momentaneous physical quantity.

The control contribution adjuster block 30 then adjusts the control contribution based on the monitoring, step 50, which may be done in a number of ways. The adjusting may comprise increasing the control contribution for a decrease in the ability of the converter to act as a virtual synchronous machine.

It is possible to first determine that the converter is close to exhausting its capability to function as a virtual synchronous machine, which may involve determining that the control contribution needs to be adjusted. The adjusting may thereby be based on a determination that the ability to act as a virtual synchronous machine is deemed insufficient, where a determination that the ability is insufficient may be based on the monitored state of the converter.

In order to make this determination, the control contribution adjuster block 30 may compare the monitored quantity or remaining capacity with a quantity or capacity threshold, such as comparing the current, power or temperature with a current, power or temperature threshold and comparing the remaining capability with a remaining capability threshold. In case the quantity or remaining capability reaches the threshold, it is then possible that the control contribution is adjusted with a fixed adjustment value. This can be done in a few different ways. The monitoring may comprise comparing a physical quantity with a corresponding physical quantity threshold, determining that the converter is unable to act as a virtual synchronous machine in case the threshold is reached and performing the adjusting of the control contribution based on the determining that the converter is unable to act as a virtual synchronous machine. The physical quantity may be a physical quantity that is delivered to or received by the converter, such as current or power, in which case the threshold may be a current or power limit threshold. Alternatively the physical quantity may be a quantity such as a temperature of the converter, like a temperature of a phase leg, in which case the threshold may be a temperature threshold, such as a maximum allowed temperature of a phase leg.

The control contribution adjuster block 30 may add an offset to the control contribution after the processing in the inertia processing block 28, such as an offset added to the angular velocity before the integrator block 32 or and offset added to the phase angle after the integrator block 32. This offset may be an offset obtained from a PLL. As an alternative it is possible that the control contribution adjuster block 30 influences the processing being performed in the inertia processing block 28. It is for instance possible that the at least one coefficient of the differential equation is influenced. In the case of the swing equation, both the inertia term M and the damping term Kf may for instance be constants. The control contribution adjuster block may in this case change these constants to other constants, thereby influencing the contribution.

Aspects of the invention are thus directed towards providing a modification of the VSM control concept by manipulating the at least one coefficient of the differential equation, which in the case of the swing equation may be the manipulation of the inertia and/or damping. The adjustment may thus comprise the adjustment of either the moment of inertia term or the damping term. The adjustment may comprise an increase in the damping term if the ability of the converter to act as a virtual synchronous machine is deemed insufficient. The adjustment may also comprise a decrease in the moment of inertia term if the ability of the converter to act as a virtual synchronous machine is deemed insufficient.

The at least one coefficient may be a constant. The inertia may for instance typically be constant. However according to some aspects the at least one coefficient such as inertia and/or the damping is changed when the converter reaches a limit, such as a current, power or temperature limit or based on its instantaneous current, power or thermal capabilities. The coefficient, such as the moment of inertia term or the damping term, may have two different values, a first steady state value during steady state operation and a second value to be used if the ability of the converter to act as a virtual synchronous machine is insufficient.

Another way to adjust the control contribution based on the monitoring is to realize the at least one coefficient, such as the inertia term M and/or the damping term Kf, as a function of the remaining capability. This allows a gradual change of the control contribution to be made based on the remaining capability. This function may be a continuous function, for instance a linear function. It may as an alternative be a piecewise linear or continuous function. The coefficient, such as the inertia term may thereby be provided as an at least piecewise continuous function of the available current, power and/or thermal capability of the converter.

The monitoring may in this case comprise monitoring the available current, power and/or thermal capability of the converter and the adjusting may comprise using the momentaneous available current, power and thermal capability in the function so that the inertia is changed for different values of the available current, power and thermal capability. Therefore, the control contribution adjuster block 30 may continuously determine the coefficient, such as the inertia and/or the damping factor, based on the momentaneous remaining capacity and supply the determined coefficient, such as the inertia and/or damping factor, to the inertia processing block 28. In the case of the coefficient comprising the inertia term, this term may additionally increase for an increase in the available current, power and thermal capability and decrease for a decrease in the available current, power and thermal capability.

In can thus be seen that it is possible to obtain a change of the control contribution using a variable coefficient in the differential equation, such as the inertia term M and/or damping term Kf in the swing equation, which coefficient would change depending on the operating state of the converter.

Now a few alternative ways of adjusting the control contribution will be given in some more detail.

In a first case, the control contribution adjuster block 30 may comprise a PLL block that is only initialized when a current, power or temperature limit is reached. The PLL block may then provide an offset or delay that is added to the phase angle that is the result of the processing of the inertia processing block 28, which offset or delay may be a fixed offset or delay. The offset may be added through the help of an adding block in the control path.

In a second case the control contribution adjuster block 30 sets the at least one coefficient, here exemplified by the moment of inertia term M and/or damping term Kf, which coefficient is switched between two different values depending on the operating conditions. If the converter is operating normally within current, power and/or temperature limits then the term is a first fixed value set to meet customer requirements. If the converter reaches a current, power or temperature limit threshold, then the coefficient is changed, where the inertia term M may be decreased while the damping term Kf may be increased to speed up synchronization. The decrease or increase may then be the change to a second fixed value.

In a third case, the coefficient may be a function. The inertia M may as an example be an Inertia function of the remaining current, power or thermal capability. In this case the control contribution adjuster block 30 sets the coefficient such as the moment of inertia M, which is thus a continuous (potentially piecewise) function, based on the currently available or momentaneous current, power and/or thermal capability. The inertia constant may then be reduced based on the converter operating point.

The third case described above has the further advantage that it provides a smoother control compared with the threshold comparisons.

Figure 5:
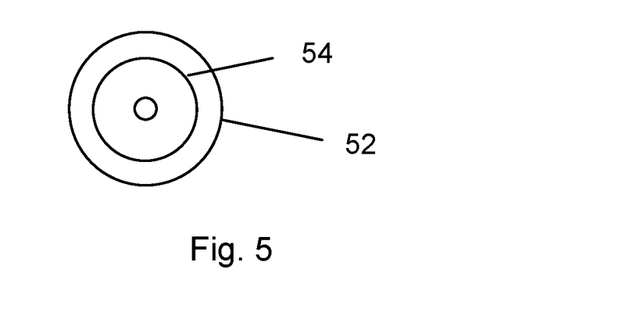

The control device 20 may be realized in the form of discrete components, such as one or more Field Programmable Gate Arrays (FPGAs), Application Specific Integrated Circuits (ASICs) or Digital Signal Processors (DSPs). However, as was mentioned above it may also be implemented in the form of a processor with accompanying program memory comprising computer program code that performs the desired control functionality when being run on the processor. The functionality for implementing the control device may additionally be provided on a data carrier comprising computer program code with instructions for implementing said functionality when being run by a processor. The data carrier may as an example be a memory stick or a CD Rom disk. FIG. 5 schematically shows a CD Rom disk 52 comprising such computer program code 54.

From the foregoing discussion it is evident that the present invention can be varied in a multitude of ways. It shall consequently be realized that the present invention is only to be limited by the following claims.

The invention claimed is:

1. A method of controlling a voltage source converter of a power supporting arrangement to act as a virtual synchronous machine, the method comprising:
    obtaining a measured power level of the converter;
    processing the measured power level using a differential equation of an angular velocity of the virtual synchronous machine in order to obtain a control contribution, wherein the differential equation is a swing equation defining a change in the angular velocity of the virtual synchronous machine over time comprising a moment of inertia term and a damping term;
    providing a phase angle of a physical quantity used to control the converter based on the control contribution;
    monitoring an ability of the converter to act as a virtual synchronous machine;
    based on the monitoring, determining that the converter lacks the ability to act as a virtual synchronous machine; and
    adjusting the control contribution by increasing the damping term and/or decreasing the moment of inertia term in response to determining that the converter lacks the ability to act as a virtual synchronous machine.

2. The method according to claim 1, wherein the adjusting comprises increasing the control contribution for a decrease in the ability of the converter to act as a virtual synchronous machine.

3. The method according to claim 1, wherein the differential equation comprises at least one coefficient that has two different values, the two different values being a first steady state value during steady state operation and a second value to be used if the converter lacks the ability to act as a virtual synchronous machine, and wherein the adjusting comprises adjusting the coefficient.

4. The method according to claim 1, wherein the monitoring comprises:
    comparing a physical quantity of the converter with a corresponding physical quantity threshold, wherein the physical quantity is a quantity of current, power or temperature of the converter and the threshold is a current, power or temperature limit threshold; and
    determining that the converter is unable to act as a virtual synchronous machine because the threshold has been reached;
    wherein the adjusting of the control contribution is performed based on the determining that the converter is unable to act as a virtual synchronous machine.

5. The method according to claim 1, wherein the differential equation comprises at least one coefficient and the adjusting comprises adjusting the coefficient;
    wherein the monitoring comprises monitoring an available current, power and/or thermal capability of the converter;
    wherein the at least one coefficient is provided as an at least piecewise continuous function of the available current, power and/or thermal capability of the converter; and
    wherein the adjusting comprises using a momentaneous available current, power and/or thermal capability in the function so that the at least one coefficient is changed for different values of the available current, power and thermal capability.

6. The method according to claim 5, wherein the moment of inertia term increases for an increase in the available current, power and/or thermal capability and decreases for a decrease in the available current, power and/or thermal capability.

7. A control device for a voltage source converter of a power supporting arrangement, wherein the voltage source converter operates as a virtual synchronous machine and wherein the control device is configured to:
    obtain a measured power level of the converter;
    process the obtained power level using a differential equation of an angular velocity of the virtual synchronous machine in order to obtain a control contribution, wherein the differential equation is a swing equation defining a change in the angular velocity of the virtual synchronous machine over time comprising a moment of inertia term and a damping term;
    provide a phase angle of a physical quantity used to control the converter based on the control contribution;
    monitor an ability of the converter to act as a virtual synchronous machine; and
    adjust the control contribution based on the monitored ability so that the control contribution is adjusted by increasing the damping term and/or decreasing the moment of inertia term when the converter lacks the ability to act as a virtual synchronous machine.

8. A power supporting arrangement comprising:
    a voltage source converter; and
    the control device according to claim 7, the control device for controlling the voltage source converter to operate as a virtual synchronous machine.

9. The power supporting arrangement according to claim 8, further comprising an energy storage system connected to the voltage source converter.

10. The power supporting arrangement according to claim 9, wherein the voltage source converter has an AC (alternating current) side for connection to an AC power grid and a DC (direct current) side and the energy storage system is connected to the DC side of the voltage source converter.

11. The power supporting arrangement according to claim 10, further comprising a DC link with a first DC line connected between the DC side of the voltage source converter and a first end of the energy storage system and a second DC line connected between the DC side of the voltage source converter and a second end of the energy storage system, wherein the voltage source converter comprises a first group of phase legs connected between the first DC line and corresponding phases of the power grid and a second group of phase legs connected between the second DC line and corresponding phases of the power grid.

12. A non-transitory computer readable medium storing program code for controlling a voltage source converter of a power supporting arrangement to act as a virtual synchronous machine, wherein the computer program code, when acted upon by a processor is configured to cause the processor to:
    obtain a measured power level of the converter;
    process the obtained power level using a differential equation of an angular velocity of the virtual synchronous machine in order to obtain a control contribution, wherein the differential equation is a swing equation defining a change in the angular velocity of the virtual synchronous machine over time comprising a moment of inertia term and a damping term;
    provide a phase angle of a physical quantity used to control the converter based on the control contribution;
    monitor an ability of the converter to act as a virtual synchronous machine, and
    adjust the control contribution based on the monitored ability, wherein the control contribution is adjusted by increasing the damping term and/or decreasing the moment of inertia term when the converter lacks the
ability to act as a virtual synchronous machine.

* * * * *